US006811254B2

(12) United States Patent
Ifergan

(10) Patent No.: US 6,811,254 B2
(45) Date of Patent: Nov. 2, 2004

(54) EYEGLASS WITH AUXILIARY LENSES

(75) Inventor: Thierry Ifergan, Aventura, FL (US)

(73) Assignee: Chic Optic Inc., Montreal (CA)

( * ) Notice: Subject to any disclaimer, the term of this patent is extended or adjusted under 35 U.S.C. 154(b) by 0 days.

(21) Appl. No.: 10/290,318

(22) Filed: Nov. 8, 2002

(65) Prior Publication Data

US 2004/0090593 A1 May 13, 2004

(51) Int. Cl.[7] .................................................. G02C 7/08
(52) U.S. Cl. ........................................... 351/57; 351/47
(58) Field of Search .............................. 351/47, 48, 57, 351/58

(56) References Cited

U.S. PATENT DOCUMENTS

| | | |
|---|---|---|
| 1,679,233 A | 7/1928 | Strauss |
| 2,737,847 A | 3/1956 | Tesauro |
| 2,770,168 A | 11/1956 | Tesauro |
| 3,498,701 A | 3/1970 | Miller |
| 3,531,188 A | 9/1970 | LeBlanc |
| 3,531,190 A | 9/1970 | LeBlanc |
| 3,536,385 A | 10/1970 | Johnston |
| 3,565,517 A | 2/1971 | Gitlin |
| 3,582,192 A | 6/1971 | Gitlin |
| 3,838,914 A | 10/1974 | Fernandez |
| 4,070,103 A | 1/1978 | Meeker |
| 4,070,105 A | 1/1978 | Marzouk |
| 4,196,981 A | 4/1980 | Waldrop |
| 4,217,037 A | 8/1980 | Lemelson |
| 4,547,909 A | 10/1985 | Bell |
| 4,988,181 A | 1/1991 | Riach, Jr. |
| 5,181,051 A | 1/1993 | Townsend et al. |
| 5,243,366 A | 9/1993 | Blevins |
| 5,321,442 A | 6/1994 | Albanese |
| 5,389,981 A | 2/1995 | Riach, Jr. |
| 5,410,763 A | 5/1995 | Bolle |
| 5,416,537 A | 5/1995 | Sadler |
| 5,568,207 A | 10/1996 | Chao |
| 5,642,177 A | 6/1997 | Nishioka |
| 5,682,222 A | 10/1997 | Chao |
| 5,696,571 A | 12/1997 | Spencer et al. |
| 5,737,054 A | 4/1998 | Chao |
| 5,786,880 A | 7/1998 | Chao |
| 5,877,838 A | 3/1999 | Chao |
| 5,882,101 A | 3/1999 | Chao |
| 5,883,688 A | 3/1999 | Chao |
| 5,883,689 A | 3/1999 | Chao |
| 5,889,575 A | 3/1999 | Wang |
| 5,975,691 A | 11/1999 | Ku |
| 6,116,730 A | 9/2000 | Kwok |
| RE37,545 E | 2/2002 | Chao |
| 6,474,811 B2 * | 11/2002 | Liu .............................. 351/47 |
| 6,488,372 B1 * | 12/2002 | Park ............................ 351/47 |
| 2001/0036170 A1 | 11/2001 | Xiao |
| 2002/0093622 A1 | 7/2002 | Tostado |

FOREIGN PATENT DOCUMENTS

| | | |
|---|---|---|
| CA | 2180714 | 5/1997 |
| CA | 2223295 | 6/1998 |
| CA | 2235466 | 7/1998 |
| CA | 2235917 | 7/1998 |
| CA | 2258142 | 8/1998 |
| CA | 2235088 | 10/1998 |
| CA | 2235798 | 10/1998 |
| CA | 2235802 | 10/1998 |
| CA | 2235818 | 10/1998 |
| CA | 2235823 | 10/1998 |
| CA | 2235826 | 10/1998 |

(List continued on next page.)

Primary Examiner—Huy Mai

(57) ABSTRACT

Eyeglasses comprise a primary frame and an auxiliary frame detachably secured to the primary frame by interaction of magnetic members on the frames. The frames and magnetic members are configured to maintain the frames in a first orientation in which the auxiliary frame overlies the primary frame and a second orientation in which the auxiliary frame is disposed above and away from the optical axis of lenses carried in the primary frame.

18 Claims, 8 Drawing Sheets

FOREIGN PATENT DOCUMENTS

| | | |
|---|---|---|
| CA | 2235897 | 10/1998 |
| CA | 2286765 | 10/1998 |
| CA | 2313976 | 10/1998 |
| CA | 2236025 | 4/1999 |
| CA | 2274221 | 12/1999 |
| CA | 2292390 | 4/2000 |
| CA | 2269373 | 5/2000 |
| CA | 2216280 | 8/2002 |
| CH | 572222 | 1/1976 |
| CN | 107096 | 7/1985 |
| CN | 1117593 | 2/1996 |
| CN | 84105025 | 4/1996 |
| DE | 1797366 | 1/1971 |
| DE | G8507761.5 | 6/1985 |
| DE | G8806898.6 | 10/1988 |
| DE | 3905041 A1 | 8/1990 |
| DE | 3919489 A1 | 12/1990 |
| DE | 3920879 A1 | 1/1991 |
| DE | 3921987 A1 | 1/1991 |
| DE | 3933310 A1 | 1/1991 |
| DE | G9216919.8 | 1/1993 |
| DE | 4316698 A1 | 11/1994 |
| DE | 29518590 U1 | 3/1996 |
| DE | 29516670 U1 | 5/1996 |
| DE | 19543346.7-5 | 9/1996 |
| EP | 0469699 A1 | 2/1992 |
| EP | 0743545 A1 | 5/1997 |
| EP | 773463 | 5/1997 |
| EP | 848276 | 6/1998 |
| EP | 1 184711 A1 | 8/2000 |
| FR | 915421 | 11/1946 |
| FR | 1061253 | 11/1953 |
| FR | 1266652 | 6/1961 |
| FR | 2483632 | 12/1981 |
| FR | 1136114 | 5/1989 |
| FR | 2657436 | 7/1991 |
| FR | 1037755 | 5/1993 |
| GB | 855268 | 8/1959 |
| GB | 846425 | 8/1960 |
| JP | 44-15392 | 7/1969 |
| JP | 54-111841 | 9/1979 |
| JP | 54-111842 | 9/1979 |
| JP | 55-50217 | 4/1980 |
| JP | 56-29209 | 3/1981 |
| JP | 57-184910 | 11/1982 |
| JP | 61-2621 | 1/1986 |
| JP | 540493 | 8/1990 |
| JP | 2109325 | 8/1990 |
| JP | 5157997 | 6/1993 |
| JP | 3011174 | 3/1995 |
| JP | 128620 | 5/1995 |
| JP | 7156856 | 5/1995 |
| JP | 3031881 | 12/1996 |
| JP | 8153172 | 4/1997 |
| JP | 9101489 | 4/1997 |
| JP | 9105889 | 4/1997 |
| RU | 220885 | 9/1968 |
| WO | WO 90/09611 | 8/1990 |
| WO | WO 01/13163 A1 | 2/2001 |

* cited by examiner

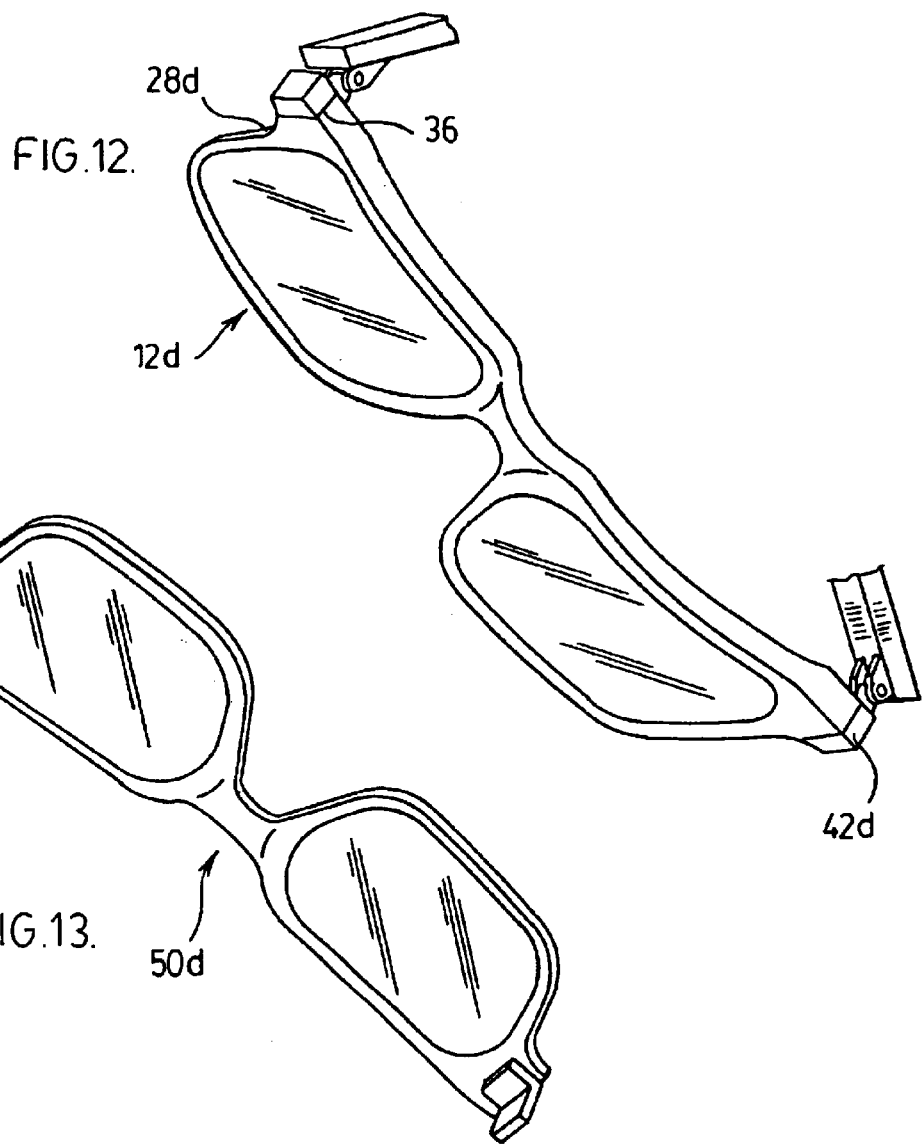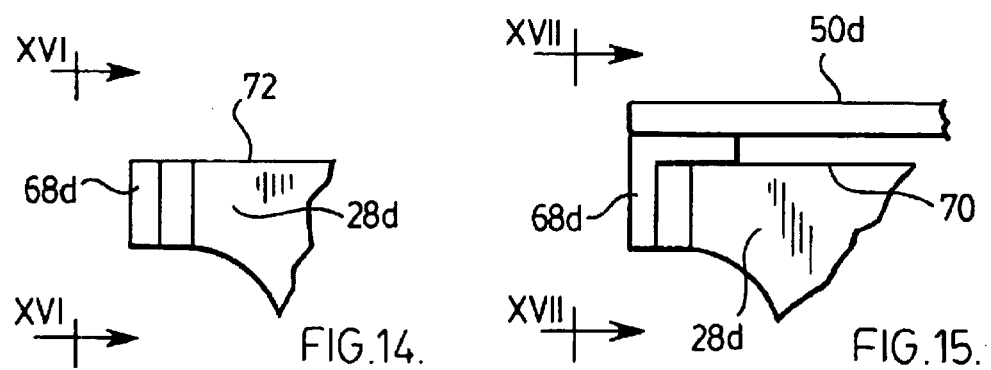

EYEGLASS WITH AUXILIARY LENSES

FIELD OF THE INVENTION

The present invention relates to eyeglasses.

BACKGROUND OF THE INVENTION

Eyeglasses are of course a well-known expedient to correct defects in the vision of the wearer. Eyeglasses are also used to shield the eyes of the wearer from adverse conditions, particularly bright sunlight.

For users of eyeglasses with corrective lenses, it is not unusual to provide additional auxiliary lenses that can be attached over the lenses of the corrective eyeglasses to provide protection against sunlight. Typically, the auxiliary lens is secured by mechanical clips but difficulty in attaching the clips has led to the adoption of magnetic retention for the auxiliary lens.

In normal use, the auxiliary lens will either be attached to or detached from the primary lens as the ambient light conditions vary. However, in certain situations, such as when driving a vehicle, it is desirable to retain the auxiliary lens on the primary lens even when the auxiliary lens is not required. Mechanical hinge arrangements that allow the auxiliary lens to be "flipped up" relative to the primary frame are known and in wide spread use. However, such arrangements require mechanical connection to the primary lens and the provision of a hinge mechanism at the bridge of the frame to allow for the adjustment of the auxiliary lens relative to the primary lens.

It is therefore an object of the present invention to obviate or mitigate the above disadvantages.

In accordance with one aspect of the present invention there is provided an eyeglass having a primary frame and an auxiliary frame. The frames are secured to one another by interaction of magnetic members on the frames. The frames and magnetic members are configured to be operable to maintain the frames in a first orientation in which the auxiliary frame overlies the primary frame and in a second orientation in which the auxiliary frame is disposed above and away from the optical axis of the lenses of the primary frame.

BRIEF DESCRIPTION OF THE DRAWINGS

Embodiments of the invention will now by described by way of example only with reference to the accompanying drawings in which:

FIG. 12 is a perspective view similar to FIG. 1 of a still further embodiment of eyeglass.

FIG. 13 is a rear perspective view of an auxiliary eyeglass for use with the primary frames of FIG. 12.

FIG. 14 is a rear view of a portion of the frame in FIG. 12 with the auxiliary frame attached in a first orientation.

FIG. 15 is a view similar to FIG. 14 with the auxiliary frame in a second orientation.

DESCRIPTION OF THE PREFERRED EMBODIMENTS

Figure 1:
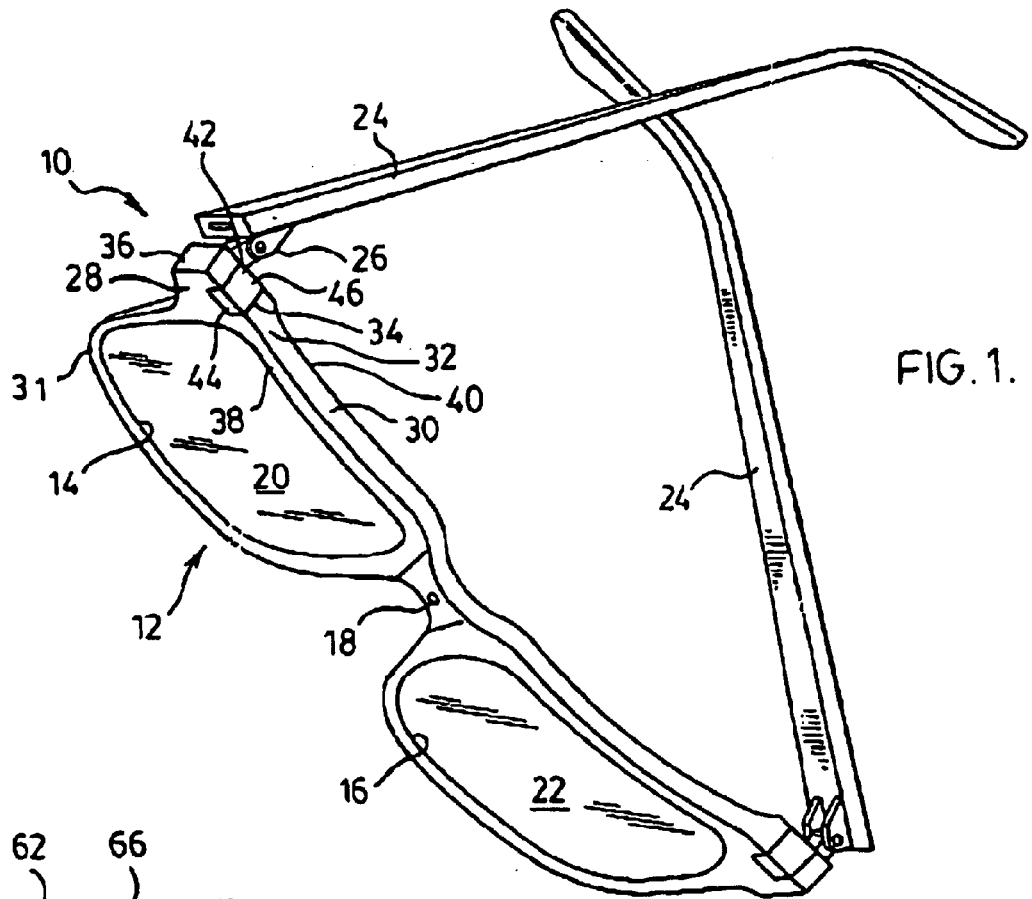
FIG. 1 is a perspective view of a primary frame.

Referring therefore to FIG. 1, eyeglasses 10 includes a primary frame 12 having a pair of lens openings 14, 16 interconnected by a bridge 18. Corrective lenses 20, 22 are received in the openings 14, 16 respectively.

Side arms 24, commonly referred to as temples, are connected by a hinge 26 to the temple region 28 of the primary frame. The temple region 28 is formed at the intersection of a main frame member 30 and lens rim loop 31. It will be appreciated that the frame member 30 and rim loop 32 are moulded to provide a unitary construction although alternative constructions using individual components are envisaged within the scope of the invention.

Figure 4:
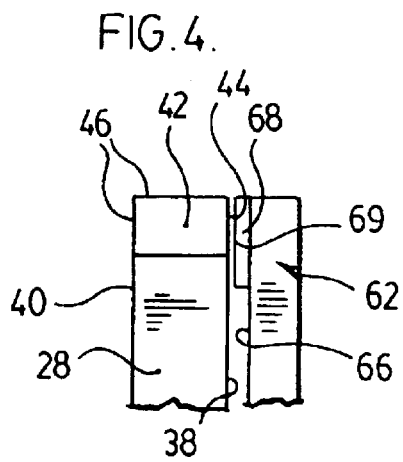
FIG. 4 is a view on the line IV—IV of FIG. 3 in a first orientation of the frames.

The main frame member 30 has an upwardly directed surface 32 that extends into the temple region 28. A notch 34 is formed in the upper surface 32 adjacent to but inwardly spaced from the end 36 of the temple region 28. As seen in FIG. 4, the notch extends across the main frame member 30 so as to intersect the front and rear surfaces 38, 40 of the main frame member 30. A magnetic insert 42 is located in the notch 34 and secured by adhesive, mechanical connection or the like. The magnetic insert 42 may be a magnet or may be a magnetic material that is attracted to a magnet. The magnetic insert 42 conforms to the profile of the main frame member 30 and has a forwardly directed surface 44 and an upwardly directed surface 46. The surfaces are flush with or slightly proud of the adjacent surface of the main frame member 30.

Figure 2:
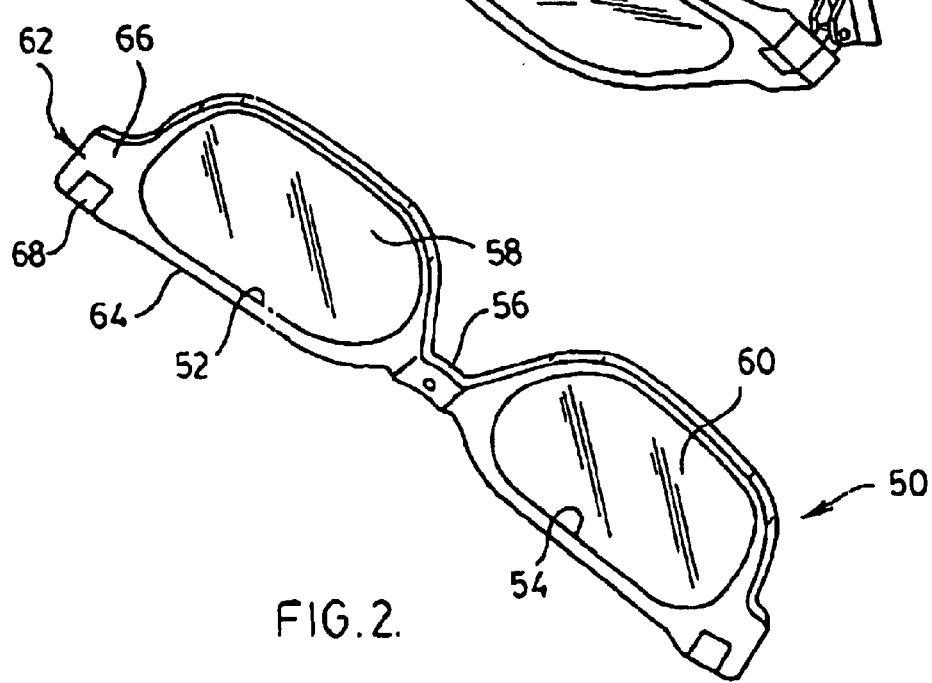
FIG. 2 is a rear perspective view of an auxiliary frame.
Figure 3:
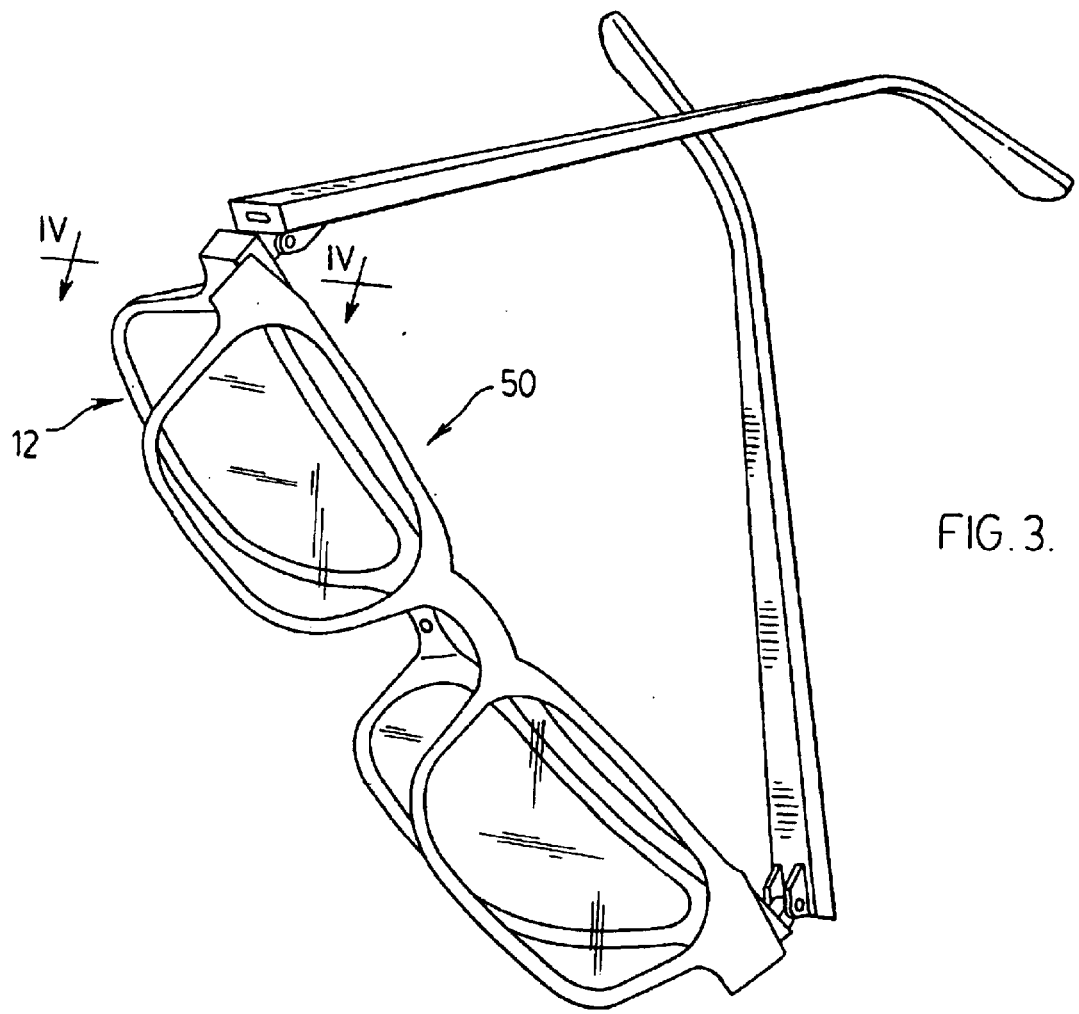
FIG. 3 is perspective view showing the primary and auxiliary frames assembled.

The spectacles 10 include an auxiliary frame 50 as shown in FIG. 2. The auxiliary frame 50 has a shape complimentary to that of the primary frame 12 having a pair of lens openings 52, 54 interconnected by a bridge 56. Tinted lenses 58, 60 are located within the lens openings 52, 54. Temple regions 62 project laterally from opposite ends of a main frame member 64 and each has a rearwardly directed surface 66. The surface 66 carries a magnetic member 68 having an outer surface 69 that may be mounted on the surface 66 or accommodated within a recess formed in the surface 66. The magnetic member 68 may be either a magnet or a magnetisable material attracted by a magnetic force when the insert 42 is itself a magnet. The magnetic member 68 is positioned so as to coincide with the location of the notch 34 and therefore the magnetic insets 42 on the upper frame member 30 of the primary frame 12.

In use, the auxiliary frame 50 may be located in front of the primary frame 12 with the surfaces 44, 66 in abutment to provide protection for the user and is secured by interaction between the magnetic inserts 42 and magnetic member 68. As noted above, at least one of the magnetic inserts 42, and magnetic member 68 must be a magnet and the other either a magnet or manetisable material to ensure that the auxiliary frame 50 is retained on the primary frame 12. With the auxiliary frame in position, the tinted lenses 58, 60 provide additional protection to the user.

Figure 5:
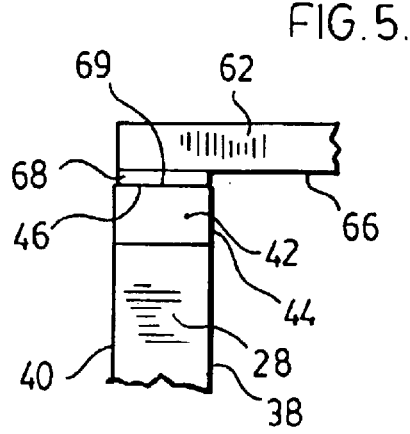
FIG. 5 is a view similar to FIG. 4 with the frames disposed in a second orientation.

If the protection afforded by the lenses 58, 60 is no longer required, the configuration of the frames 12, 50 and magnetic inserts 42 enables the auxiliary frame 50 to be moved to an alternative position illustrated in FIG. 5. The lenses 58, 60 are moved up and out of the optical axis of the lenses 20, 22 but the auxiliary frame 50 is retained on the primary frame 12. As shown in FIG. 5, the auxiliary frame 50 may be rotated through 90° so that the surface 69 of magnetic member 68 is moved into abutment with the upwardly directed face 46 of the magnetic insert 42. In this position, the magnetic forces serve to maintain the auxiliary frame 50 in a stable position. The disposition of the forwardly directed faces 44 and the upwardly directed face 46 at 90° to one another provides a pair of stable positions to support the auxiliary frame. The faces 44, 46 provide a pair of abutment surfaces that are positioned to contact the magnetic member 68 at the respective stable positions and thereby retain the auxiliary frame on the primary frame. The planar nature of abutment surface 44, 46 inhibit relative movement due to shock loads imposed on the auxiliary frame in use.

Figure 6:
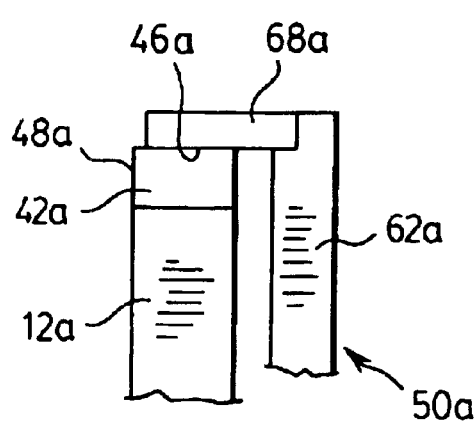
FIG. 6 is a view similar to FIG. 4 of an alternative embodiment of the frames.

An alternative embodiment is shown in FIG. 6 where like reference numerals will be used with like components with a suffix "a" added for clarity. In the embodiment of FIG. 6, the magnetic member 68a is arranged to project rearwardly from the temple 62a. Insert 42a provides a first stable position in which the magnetic member 68a engages the upwardly directed surface 46a of the insert. In this position, the auxiliary frame 50a is maintained overlying the primary frame 12a.

Figure 7:
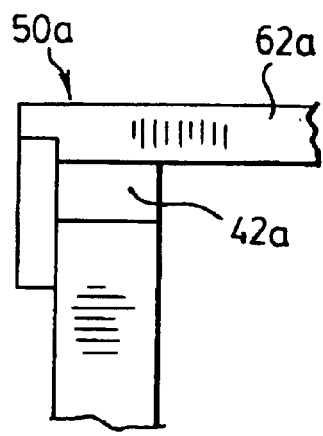
FIG. 7 is a view of the embodiments shown in FIG. 6 with the frames disposed in an alternative orientation

In an alternative position shown in FIG. 7, the magnetic member 62a engages a rear face 48 of the magnetic insert 42a with the auxiliary frame projecting outwardly from the main frame 12a.

Figure 8:
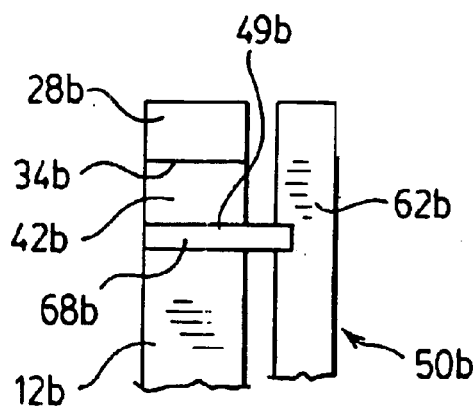
FIG. 8 is a view similar to FIG. 4 of an alternative embodiment
Figure 9:
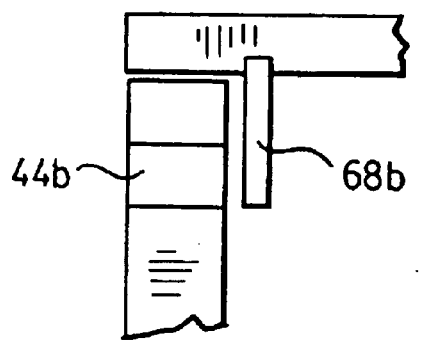
FIG. 9 is a view of the embodiment of FIG. 8 in an alternative configuration of frames.

A further embodiment is shown in FIGS. 8 and 9 in which the notch 34b is provided on the underside of the temple 28b. The magnetic member 68b projects rearwardly from the beneath the temple 62b so as to engage a downwardly directed surface 49b of the insert 42b. In this position the auxiliary frame 50b is maintained in a stable position overlying the primary frame 12b.

To move the auxiliary frame 50b to an alternative position shown in FIG. 9, it is rotated through 90° so that the magnetic member 68b engages the forwardly directed face 44b of the magnetic insert 42b. The magnetic forces between the insert 42b and the magnetic member 68b maintain the primary and auxiliary frames in stable position with the main frame member of the auxiliary frame 50b overlying the upper surface 32b of the main frame member 30b.

Figure 10:
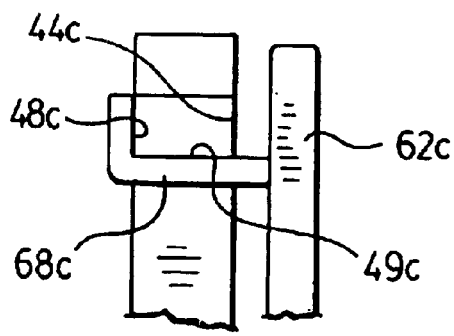
FIG. 10 is a view similar to FIG. 4 of a still further embodiment.
Figure 11:
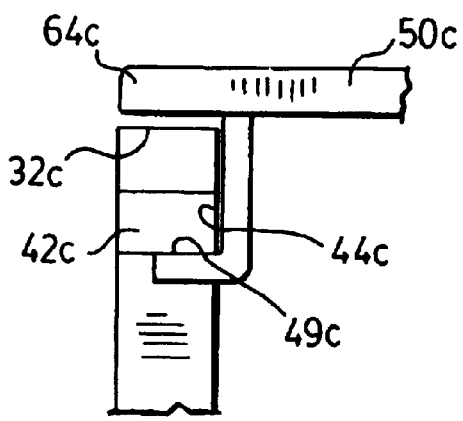
FIG. 11 is a view of the embodiment of FIG. 10 in an alternative configuration.

A further embodiment is shown is FIGS. 10 and 11 in which the magnetic member 68c is formed as an L-shaped arm that projects rearwardly from the temple 62c. The distal end of the L-shaped arm engages a rearwardly directed face of the insert 48c to hold the auxiliary and primary frames in stable position. To move the auxiliary frame to an alternative position out of the optical axis of the lenses 20, 22, the auxiliary frame 50c is rotated through 90° causing the L-shaped arm to engage the downwardly directed and forwardly directed faces 49c, 44c respectively of the insert 42c. The main frame member 64c of the auxiliary frame 50c overlies the upper surface 32c of the main frame member 30c.

In each of the above embodiments, a pair of stable surfaces is provided to support the main and auxiliary frame members.

Figure 16:
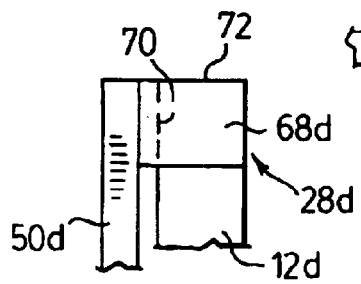
FIG. 16 is a view on the line XVI—XVI of FIG. 14.
Figure 17:
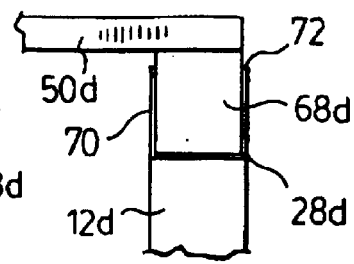
FIG. 17 is a view on the line of FIG. 18 XVII—XVII.

In a further embodiment shown in FIGS. 12 through 15, the magnetic insert 42d is provided on the end face 36 of the temple 28d. In this arrangement the auxiliary frame 50d has the magnetic member 68d projecting rearwardly and lying in a generally vertical plane. The spacing between the magnetic member 68d corresponds to the spacing between the end faces of the inserts 42d so that the auxiliary and main frames are connected by the magnetic forces between the insert 44d and the magnetic member 68d. As can be seen in FIGS. 16 and 17, the temple 28d of the main frame 12e is formed with a pair of planar faces 70, 72 that provide a pair of stable supports for the auxiliary frame 50e. The interaction between the main and auxiliary frame members provides a pair of stable positions as the auxiliary frame is rotated from a position in which it overlies the primary frame to the position in which it projects above and forwardly of the primary frame. Magnetic forces between the magnetic plate 68d and the inserts 44d ensure retention of the auxiliary frame on the primary frame and the shape of the magnetic inserts and upper frame member provide the two stable positions.

Alternative cross sections of the inserts may be utilised to provide a pair of stable positions. Similarly, the stable positions may be provided by interaction with surfaces of the frame members 30, 64 where the insert does not provide a pair of stable positions or by the insert itself where the frame does not provide a pair of stable positions.

Figure 18:
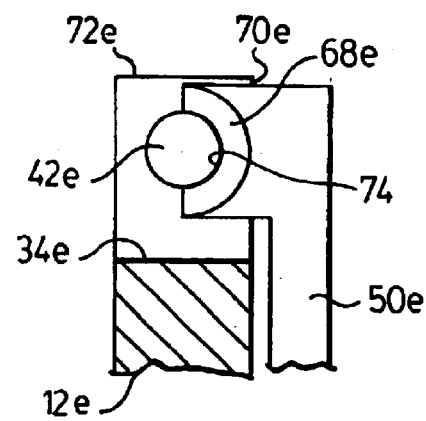
FIG. 18 is a cross sectional view of a further arrangement.
Figure 19:
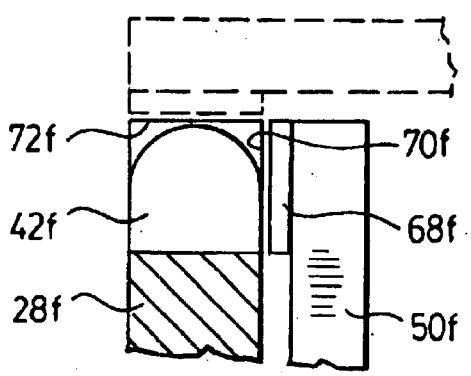
FIG. 19 is a view similar to FIG. 18 of a still further arrangement.

As seen in FIG. 18, the front face 70e and upper face 72e of the primary frame 12e may be used to provide stable positions for the auxiliary frame 50e in a manner similar to FIGS. 14 to 17. In the embodiment of FIG. 18, the magnetic member 42e is a circular bar located within the notch 34e. The magnetic member 68e projects rearwardly from the auxiliary frame 50*d* and has a semi-circular recess 74 that is complementary to the outer surface of the magnetic member 42*e*. The magnetic members 42*e*, 68*e* thus provide a pivot to allow the auxiliary frame 50*d* to move between the stable positions provided by the faces 70*e*, 72*e*, on the frame 12*d*. The rearwardly facing surfaces of the auxiliary frame to either side of the magnetic member 68*e* are planar to corporate with the faces 70*e*, 72*e* and support auxiliary frame 50*d* in either position A similar arrangement is shown in FIG. 19 where the outer surface of magnetic member 42*f* is semicircular and tangential to the adjacent surfaces 70*f*, 72*f* of the temple 28*f*. The magnetic member 68*f* is a plate that engages the magnetic member 42*f* in each of the stable positions.

In each of the above embodiments a pair of stable positions disposed at 90° to one another has been provided. Additional stable positions may be incorporated as indicated in the embodiments of FIGS. 20 to 22 and 23.

Figure 20:
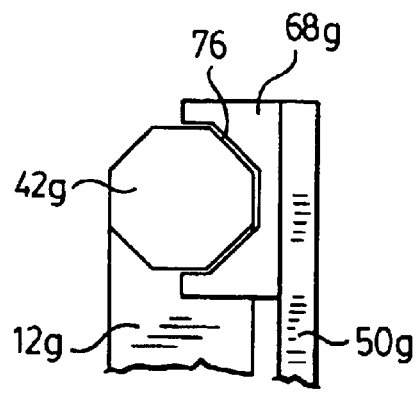
FIG. 20 is a view similar to FIG. 18 of a further embodiment.
Figure 21:
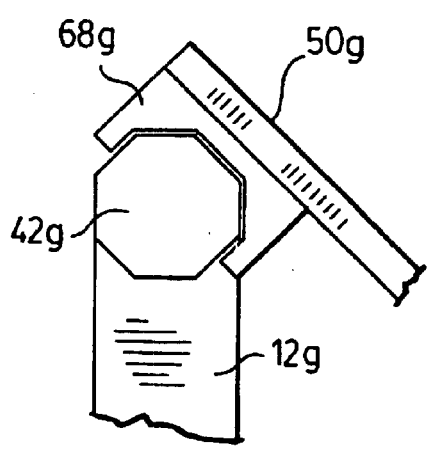
FIG. 21 is a view of the embodiment of FIG. 20 in an alternative configuration.
Figure 22:
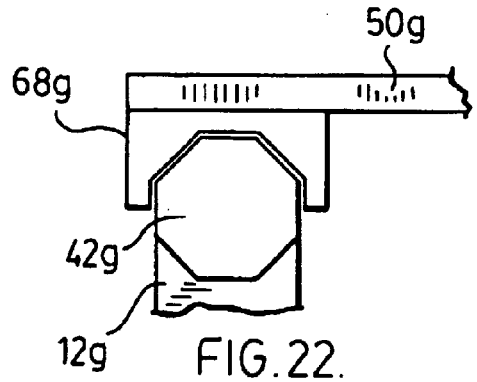
FIG. 22 is a view of the embodiment of FIG. 20 in a further configuration.

In the embodiment of FIGS. 20 to 22 an arrangement similar to that of FIG. 18 is utilised. However, in this embodiment the magnetic member 42*g* is formed as an octagonal bar with planar facets 76 intersecting at 45°. The magnetic member 68*g* is formed as an open jaw with a complementary recess for engagement with the facets of the magnetic member 42*g*.

As may be seen from FIGS. 20 to 22, the auxiliary frame 50*g* may be rotated at 45° increments relative to the main frame 12*g* with stable position provided at each increment. The auxiliary frame may thus be positioned over a 90° range as illustrated, or beyond to 135° or 180° if the design of frame permits.

Figure 23:
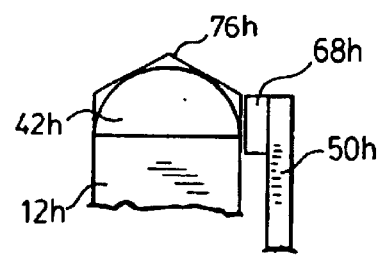
FIG. 23 is a view similar to FIG. 19 of a still further embodiment.

A similar arrangement can be obtained in a manner similar to FIG. 19, as shown in FIG. 23 with appropriate shaping of the temple region 28*h*. In this arrangement facets 76*h* are formed at the required orientation, e.g. 45°, 60° or irregular shapes to provide stable positions for the auxiliary frame 50*h* on the primary frame 12*h*.

In each of the above embodiments, planar surfaces or facets have been provided to introduce stability to the arrangement of primary and auxiliary lenses. It will be appreciated that stability may be introduced by utilising other arrangements, including pins and recesses or other inter-engaging formations with the retention provided by the interaction of the magnetic members. In some situations where the auxiliary frame is small and light, the magnetic retention over a large area, such as that shown in FIGS. 18 and 20 may be sufficient to maintain the auxiliary frame in a pair of positions provided the configuration of the frames permits relative rotation. It is believed however that the provision of cooperating planar surfaces enhances the retention in preferred orientations.

Figure 24:
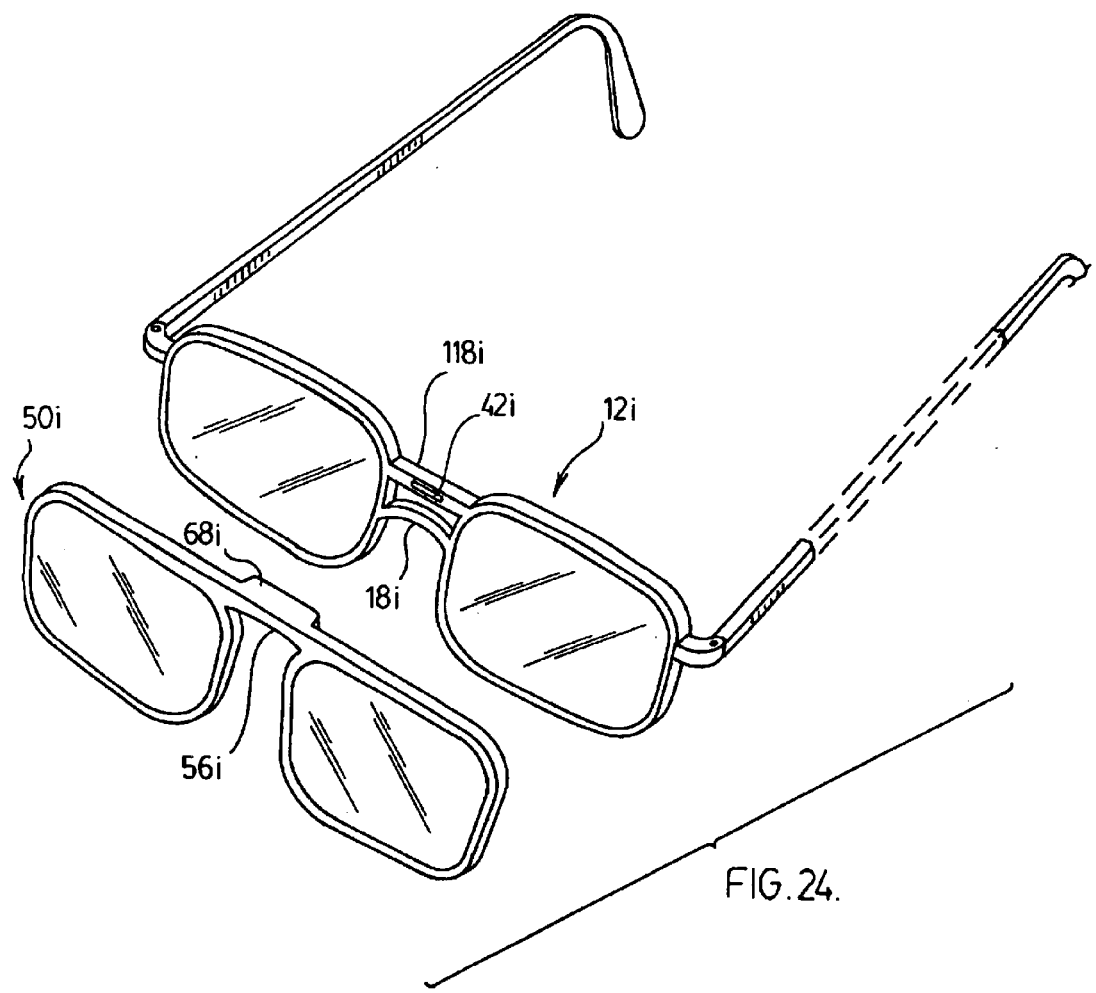
FIG. 24 is a view similar of a yet further embodiment applied to a bridge of an eyeglass.
Figure 25:
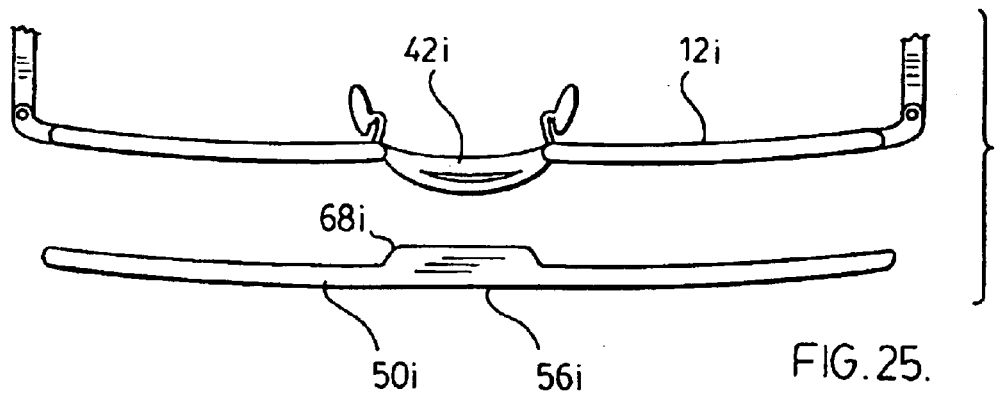
FIG. 25 is a plan view of the eyeglasses shown in FIG. 24.
Figure 26:
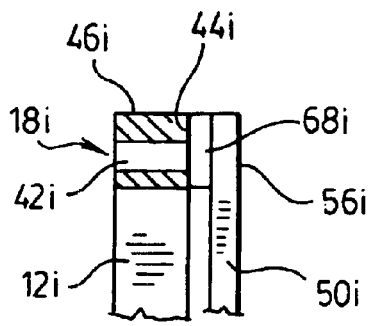
FIG. 26 is a section on the line XVI—XVI of FIG. 25.

Each of the above embodiments has also illustrated the location of the magnetic members at the temple regions. This location is preferred to provide inherent stability to the auxiliary frames when mounted. However, if preferred, the configuration of magnetic members and/or frame structure may be incorporated in the bridge 18 to provide a central mounting location where the configuration of frame permits. In this embodiment shown in FIGS. 24, 25 and 26, the primary frame 12*i* has a second bridge 118*i* above the bridge 18*i*. The second bridge 118*i* has a magnetic insert 42*i* incorporated in the upper bridge 118*i* or alternatively may be formed of magnetic material with a cross section to provide magnetic insert 42*i*. The bridge 56*i* of the auxiliary frame 50*i* carries a rearwardly directed magnetic member 68*i* that engages either the forwardly directed face 44*i* or upwardly directed face 46*i* of the magnetic member 42*i*. Again, a pair of stable surfaces are provided to maintain the auxiliary frame 50*i* in either of the preferred positions.

Other configurations as illustrated with respect to the temples may be incorporated in a similar manner into the bridges.

Figure 27:
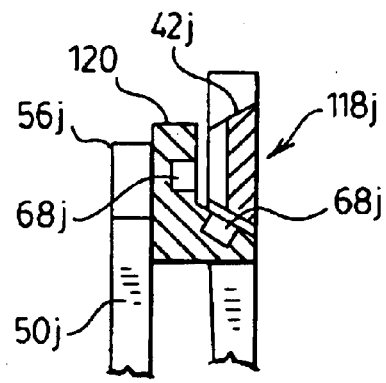
FIG. 27 is a sectional view similar to FIG. 26 of a further embodiment.

For example, as shown in FIG. 27, the upper bridge 118*j* maybe trapezoidal and an L-shaped bracket 120 secured to the bridge 56*j* of the auxiliary frame 50*j*. Each leg of the bracket 120 includes a magnetic member 68*j* that will engage the upper bridge 118*j* in one of two positions. The upper bridge 118*j* may either be magnetic or carry magnetic insert 42*j*.

As shown in FIG. 27, the insert 42*k* extends through the upper bridge between upper and lower surf and so is operable to engage one of the members 68*k* in each position to retain the auxiliary lens.

Figure 28:
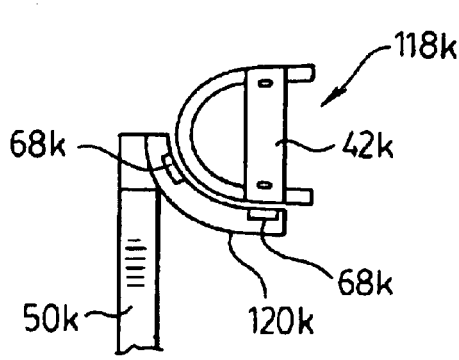
FIG. 28 is a sectional view similar to FIG. 26 of a still further embodiment.

Similarly, in FIG. 28, the upper bridge 118*k* is formed as a part cylindrical shell with a magnetic insert 42*k* within the shell. A complementary bracket 120*k* is secured to the auxiliary frame 50*k* and carries a magnetic member 68*k*. This permits the auxiliary frame to be slid between different positions on the upper bridge 118*k*.

Figure 29:
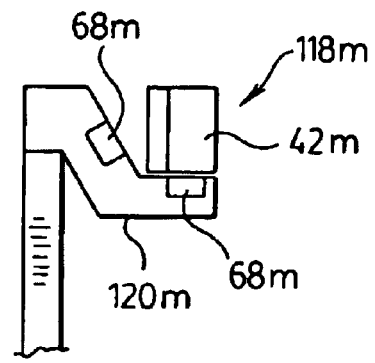
FIG. 29 is a sectional view similar to FIG. 26 of a yet further embodiment.

As a further alternative, as shown in FIG. 29, the bracket 120*m* is formed as a bell crank with legs at a 135° included angle. Each of the legs supports a magnetic member 68*m* that engages upper bridge 118. The auxiliary frame 50*m* may thus be tipped between a pair of positions and held in each by action of the magnetic members 68*m*. The bridge 118*m* may be magnetic or may carry a magnetic insert 42*m* to co-operate with the magnetic members 68*m*.

Figure 30:
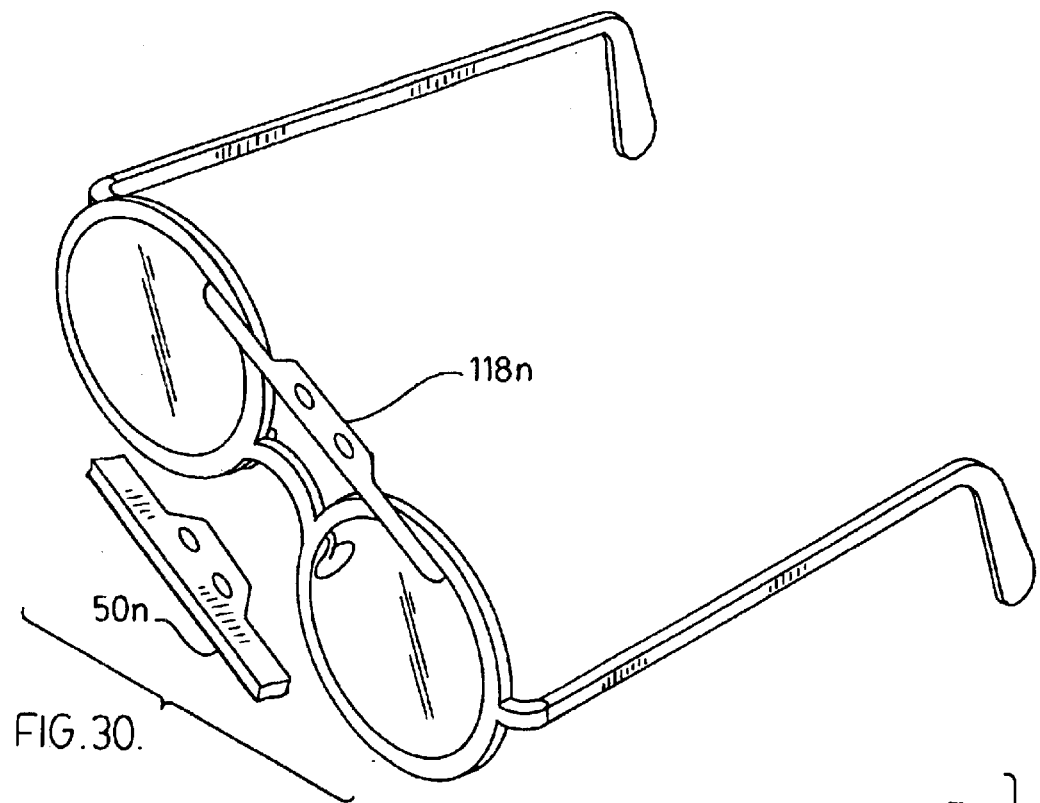
FIG. 30 is a perspective view similar to FIG. 24 of a further arrangement of eyeglass.
Figure 31:
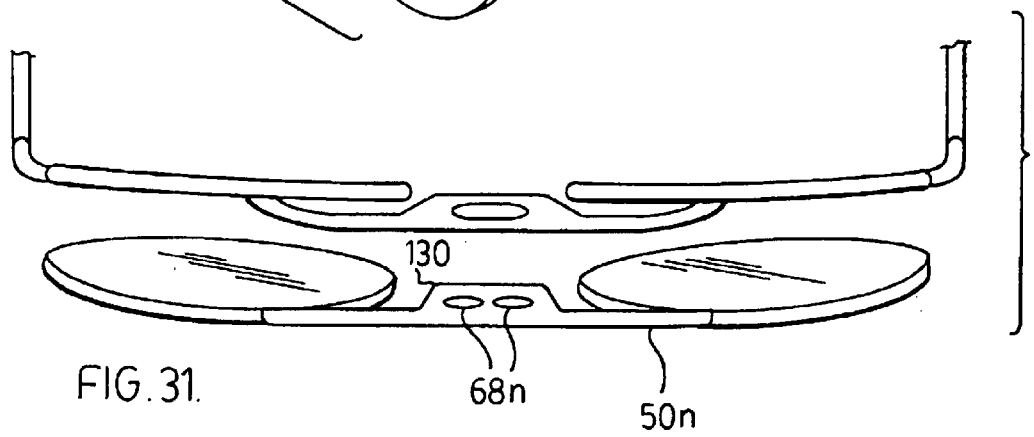
FIG. 31 is a plan view of the arrangement shown in FIG. 30.

In each of the embodiments of FIGS. 27 to 29, the auxiliary lens is held in its operative position by engaging the underside of the upper bridge member 118. As shown, in FIGS. 30 and 31, the auxiliary frame 50*n* may be provided with an overhanging lip 130 that carries a pair of magnetic inserts 68*n*. The lip 130 is positioned to engage the upper surface of the upper bridge 118*n* to hold the auxiliary lens in the operative position.

Figure 32:
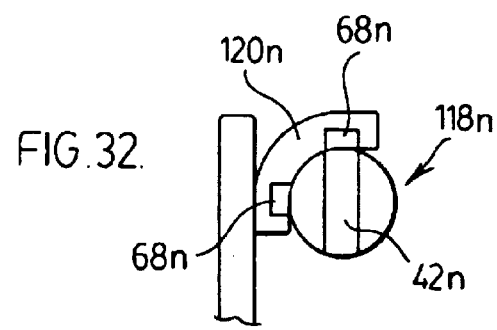
FIG. 32 is a sectional view similar to FIG. 26 of a further embodiment of the arrangement shown in FIG. 30.

The auxiliary lens may then be positioned with the lip 130 behind the upper bridge 118*n* to hold the auxiliary lens in the alternative position clear of the optical axis, As a further alternative as shown in FIG. 32, the upper bridge 118*n* is circular with insert 42*n* passing through the diameter. The bracket 120*n* is curved and carries a pair of inserts 68*n* that allow the auxiliary lens 50*n* to rotate between a pair of positions.

Although the invention has been described with reference to certain specific embodiments, various modifications thereof will be apparent to those skilled in the art without departing from the spirit and scope of the invention as outlined in the claims appended hereto.

What is claimed is:

1. Eyeglasses comprising a primary frame, and an auxiliary frame detachably secured to said primary frame by interaction of magnetic members on said frames, said frames and magnetic members being configured to maintain said frames in a first orientation in which said auxiliary frame overlies said primary frame and a second orientation in which said auxiliary frame is disposed away from the optical axis of lenses carried in said primary frame, said primary frame having a pair of temple regions, each of which includes a pair of abutment surfaces to provide alternate locations for engagement of said auxiliary frame and said primary frame, said magnetic members cooperating to hold said auxiliary frame in engagement with one of said abutment surfaces at each of said temple regions.

2. Eyeglasses according to claim 1 wherein each of said frames carries at least a pair of magnetic members at spaced locations.

3. Eyeglasses according to claim 2 wherein said abutment surfaces are provided by a pair of planar surfaces angularly disposed relative to one another on each of said magnetic members on said primary frame and said magnetic members on said auxiliary frame engage respective ones of said abutment surfaces to provide said first and second orientations.

4. Eyeglasses according to claim 3 wherein said abutment surfaces are orthogonal.

5. Eyeglasses according to claim 3 wherein one of said abutment surfaces is directed forwardly from said primary frame and another of said abutment surfaces is directed upwardly.

6. Eyeglasses according to claim 3 wherein one of said abutment surfaces is directed upwardly and another of said abutment surfaces is directed rearwardly.

7. Eyeglasses according to claim 3 wherein one of said abutment surfaces is directed rearwardly and another of said abutment surfaces is directed downwardly.

8. Eyeglasses according to claim 3 wherein one of said abutment surfaces is directed forwardly and another of said abutment surfaces is directed downwardly.

9. Eyeglasses according to claim 1 wherein a magnetic member and a pair of abutment surfaces arm provided in each temple regions of said frames, said abutment surfaces providing alternate locations for engagement of said auxiliary frame and said primary frame.

10. Eyeglasses according to claim 9 wherein said pair of abutment surfaces are provided on said magnetic members.

11. Eyeglasses according to claim 10 wherein said abutment surfaces are planar.

12. Eyeglasses according to claim 11 wherein said abutment surfaces are orthogonal to one another.

13. Eyeglasses according to claim 9 wherein said abutment surfaces are located on one of said frames adjacent to said magnetic members.

14. Eyeglasses according to claim 13 wherein said magnetic members have a curved exterior surface and said abutment surfaces are planar and project beyond said curved exterior surfaces.

15. Eyeglasses according to claim 9 wherein said primary frames includes a notch formed in an outer surface in said temple region and said magnetic member is located within said notch.

16. Eyeglasses according to claim 15 wherein said magnetic members have outwardly directed surfaces flush with said outer surface.

17. Eyeglasses according to claim 16 wherein said notch is formed in an upper surface of said primary frame and extends between oppositely directed surfaces of said primary frame.

18. Eyeglasses according to claim 16 wherein said notch is formed in a lower surface and extends between oppositely directed surfaces of said primary frame.

* * * * *